United States Patent [19]
Izui et al.

[11] Patent Number: 5,584,029
[45] Date of Patent: Dec. 10, 1996

[54] DATA PROTECTING SYSTEM FOR AN ECHANGEABLE STORAGE MEDIUM COMPRISING POWER SUPPLY CONTROL MEANS, MEDIUM DETECTION MEANS AND MEDIUM IDENTIFYING MEANS

[75] Inventors: Hiroyuki Izui; Satoru Yamaguchi; Yoshihiro Morita; Yutaka Ito, all of Kawasaki, Japan

[73] Assignee: Fujitsu Limited, Kawasaki, Japan

[21] Appl. No.: 123,250

[22] Filed: Sep. 20, 1993

[30] Foreign Application Priority Data

Nov. 25, 1992 [JP] Japan .................... 4-315391

[51] Int. Cl.$^6$ .................... G06F 12/16; G06F 1/26; G06F 13/00
[52] U.S. Cl. .................... 395/750; 395/182.18; 395/726; 369/32; 369/33; 364/707; 364/948.8; 364/948.9; 364/968; 364/DIG. 1; 364/DIG. 2
[58] Field of Search .................... 395/182.12, 726, 395/750; 364/707, 948.8, 948.9, 968; 369/32, 33

[56] References Cited

U.S. PATENT DOCUMENTS 5,339,444  8/1994  Nakajima .................... 395/750

Primary Examiner—Frank J. Asta
Attorney, Agent, or Firm—Staas & Halsey

[57] ABSTRACT

The present invention writes intrinsic information such as the current time, etc. to both a memory and a storage medium when an exchangeable storage medium inserted in a drive device is mounted to a system. If the storage medium is removed from the drive device when the storage medium is being I/O accessed, then the execution of the present and the succeeding I/O requests is suspended. Then, if a storage medium is inserted in the drive device, then it is checked whether or not the intrinsic information stored in the memory has been written to the storage medium. Only when the information has been written to the storage medium, the suspended request for the storage medium is resumed. Accordingly, even if a storage medium has been erroneously removed from the drive device, all I/O requests are surely executed without being lost if the erroneously removed medium is inserted again. Furthermore, the data in a replacing storage medium won't be erroneously lost, either. The stop of power supply for a drive device is permitted only when a storage medium is not mounted to a system. Therefore, all I/O requests for the storage medium have been executed, and the data in another storage medium are not lost when power supply is resumed with another storage medium inserted during the suspension of the electric power supply.

18 Claims, 12 Drawing Sheets

DATA PROTECTING SYSTEM FOR AN ECHANGEABLE STORAGE MEDIUM COMPRISING POWER SUPPLY CONTROL MEANS, MEDIUM DETECTION MEANS AND MEDIUM IDENTIFYING MEANS

BACKGROUND OF THE INVENTION

1. Field of the Invention

The present invention relates to a data protecting system for external storage medium for use with an information processing unit, in particular, to a data protecting system for exchangeable storage medium.

2. Description of the Related Art

A large number of floppy disks (exchangeable storage mediums) which are less expensive and more portable than hard disks are used for personal computers, workstations, office computers, and the like as data storage mediums, software distribution mediums, and so forth.

In recent years, optomagnetic disks, IC memory cards, and the like have been used as exchangeable storage mediums. Information processing units are usually provided with a drive device corresponding to an exchangeable storage medium. Files created on such a medium are accessed through the drive device.

Exchangeable storage mediums such as floppy disks are superior to other mediums in portability. However, since the users can remove a floppy disk from the drive device at any time, data of files stored on the disk may be easily destroyed unless the disk is correctly handled. In other words, if a floppy disk is removed from the drive device, while data of a file on the disk is being executed, the data may be destroyed or may not be accessed later because the file is not properly closed.

To solve such a problem, so far, the following countermeasures were taken.

When a medium is initialized, intrinsic information is written to a predetermined sector of a predetermined track of a storage medium (normally, the first sector of the first track of the storage medium). When the storage medium is removed from the drive device, the intrinsic information is stored in a memory of the information processing unit. When a storage medium is mounted in the drive device, intrinsic information of this storage medium is read. The information processing unit compares the intrinsic information of the storage medium with the intrinsic information stored in the memory. Only when they match, the information processing unit allows the storage medium inserted in the drive device to be accessed.

In such a construction, even if a storage medium is removed while it is open (namely, in an I/O accessible state), when another storage medium is inserted in the drive device, data on this storage medium is not destroyed. In addition, the file on the storage medium which was opened can be correctly closed.

However, in the above-described conventional data protecting system for exchangeable storage mediums has the following drawbacks ① to ⑤.

① When a storage medium which was initialized by an information processing unit which does not have such a data protecting function is removed from a drive device thereof, the storage medium can no longer be used. This is because predetermined intrinsic information has not been written in a predetermined area of the storage medium. Thus, once the storage medium is removed from the drive device, an information processing unit with such a data protecting function will detect a disk error.

② To allow a storage medium on which intrinsic information has not been written to be used in the unit with such a data protecting function, the storage medium should be initialized by this unit. However, when the storage medium is initialized by the unit, all data stored on the storage medium will be erased. To prevent that, the data should be saved on another storage medium. Thereafter, the saved data should be stored on the storage medium which was initialized by the system. Although such troublesome operations may be performed by a utility program, however, the operation of the program is also troublesome. When such a program is not available, it should be newly created with large labor costs.

③ When a data input/output request is performed for a storage medium, before a process for the request has been completed, if the storage medium is removed from the drive device, the data which was I/O requested will be lost. Thus, an application program should issue a data I/O request again to the operating system (OS) of the unit. To do that, however, the application program should receive information with respect to data I/O requests which were performed before the storage medium was removed from the OS. Nevertheless, conventional OS do not have such a function and thereby the acquisition of such information is almost impossible.

④ If intrinsic information cannot be correctly read from a storage medium (namely, if an I/O error takes place) or if a storage medium to be inserted in a drive device is lost, queued I/O requests performed for the storage medium cannot be cleared. To cancel the I/O requests, the unit should be turned off and then turned on again. Thus, the user should perform troublesome operations.

⑤ Although a drive device has a mechanism which electrically detects whether a storage medium is inserted or removed, while the drive device is turned off, of course, such a detecting mechanism does not work and thereby the drive device cannot detect an insertion and a removal of the storage medium.

Thus, when a storage medium has been inserted in a drive device, if its power is stopped, this storage medium can be replaced with another storage medium. In the conventional data protecting system, when a storage medium has been inserted and it is in an operable state as a file system in the unit, the drive device can be turned off.

Thus, in an information processing unit having for example a resume function, when a storage medium inserted in a drive device is in an operable state as a file system in the unit, after the power of the drive device is stopped and then the storage medium is replaced with another storage medium, if the power to the drive device is resumed, management information of the storage medium which was inserted in the drive device and which is managed by the OS does not match the management information of the storage medium which is currently inserted. If a data I/O process is performed for the storage medium which is currently inserted in the drive device, data stored on the storage medium which was inserted in the drive device may be destroyed.

In addition, while a storage medium which is inserted in a drive device is in an I/O accessible state (namely, a file on the storage medium is open), if the storage medium is replaced, as with the above case, due to the resume function, data stored on a storage medium newly inserted in the drive device may be destroyed.

SUMMARY OF THE INVENTION

A first object of the present invention is to provide a data protecting system for exchangeable storage medium in order to allow an exchangeable storage medium which was initialized by an information processing unit which does not have a data protecting function of data of a storage medium to be protected without necessity of reinitialization of the storage medium.

A second object of the present invention is to provide a data protecting system for exchangeable storage medium in order to allow a storage medium which is being I/O processed to be removed from a drive device and to resume the I/O process without loss.

A third object of the present invention is to provide a data protecting system for exchangeable storage medium in order to allow a storage medium which is being I/O processed to be removed from a drive device and to cancel an I/O request for the storage medium without necessity of rebooting of the unit, and to prevent data of another storage medium newly inserted in the drive device from being destroyed.

A fourth object of the present invention is to provide a data protecting system for exchangeable storage medium for preventing data of a storage medium newly inserted in a drive device of an information processing unit having a function for stopping the supply of electric power to the drive device from being destroyed when another storage medium was replaced with the new storage medium while the supply of electric power to the drive device was being stopped.

The present invention relates to a data protecting system for exchangeable media for use in an information processing device having a drive device in which the exchangeable medium is inserted. It comprises a detection unit for detecting insertion and removal of the exchangeable storage medium in and from the drive device, an intrinsic information writing unit for writing intrinsic information to both a predetermined area of the exchangeable storage medium and a memory of the information processing device when a request to set the exchangeable storage medium in an operable state as a file system in the information processing device, a medium identifying unit for determining, if the detecting unit has detected that the exchangeable storage medium was removed from the drive device when it was in an I/O accessible state and then an exchangeable storage medium was inserted again in the drive device, whether or not the removed exchangeable storage medium was inserted again in the drive device by checking if the intrinsic information written by the intrinsic information writing unit to the memory in the information processing device has been written to the predetermined area of the inserted exchangeable storage medium, and a permitting unit for permitting the inserted exchangeable storage medium to be I/O accessed only when the medium identifying unit has determined that the removed exchangeable storage medium was inserted again in the drive device.

The present invention further comprises a suspending unit for suspending the present I/O request being processed and the succeeding I/O requests for the exchangeable storage medium if the detecting unit has detected that an exchangeable storage medium was removed from the drive device when it was in an I/O accessible state, and a resuming unit for resuming an execution of the I/O request suspended by the suspending unit when the medium identifying unit has determined that the exchangeable storage medium removed from the drive device was inserted again in the drive device.

The present invention further comprises a first forcibly terminating unit for forcibly terminating the I/O requests suspended by the suspending unit if an error has arisen when the medium identifying unit reads data from the predetermined area of the exchangeable storage medium inserted in the drive device.

The present invention further comprises an inquiry portion for inquiring of an operator whether to terminate a determination process of the medium identification portion when the determined result of the medium identification portion is in that the exchangeable storage medium newly inserted is not the same as the exchangeable storage medium removed and a second forced termination portion for forcedly terminating the determination process of the medium identification portion and I/O requests suspended by the suspension portion when a reply of the operator to the inquiry portion is a permission of the termination of the determination process of medium identification portion.

The present invention further comprises a first determination portion for determining whether or not the exchangeable storage medium inserted in the drive device is in an operable state as a file system in the information processing unit when a power supply stop request for the drive device takes place, a second determination portion for determining whether or not the exchangeable storage medium is in an accessible state when the result of the first determination portion is the operable state, and a power supply control portion for determining whether or not to stop a supply of electric power to the drive device according to the results of the first determination portion and the second determination portion, so as to control the supply of electric power to the drive device.

The power supply control portion causes the exchangeable storage medium to be in an inoperable state in the information processing unit and then stop the supply of electric power to the drive device when the result of the second determination portion is not the I/O accessible state.

The power supply control portion does not stop the supply of electric power to the drive device not be stopped when the result of the second determination portion is not the I/O accessible state.

The power supply control portion stops the supply of power to the drive device when the result of the first determination portion is the operable state.

BRIEF DESCRIPTION OF THE DRAWINGS

One skilled in the art can easily understand the additional features and objects of this invention from the description of the preferred embodiments and some of the attached drawings. In the drawings.

DESCRIPTION OF THE PREFERRED EMBODIMENTS

Figure 1:
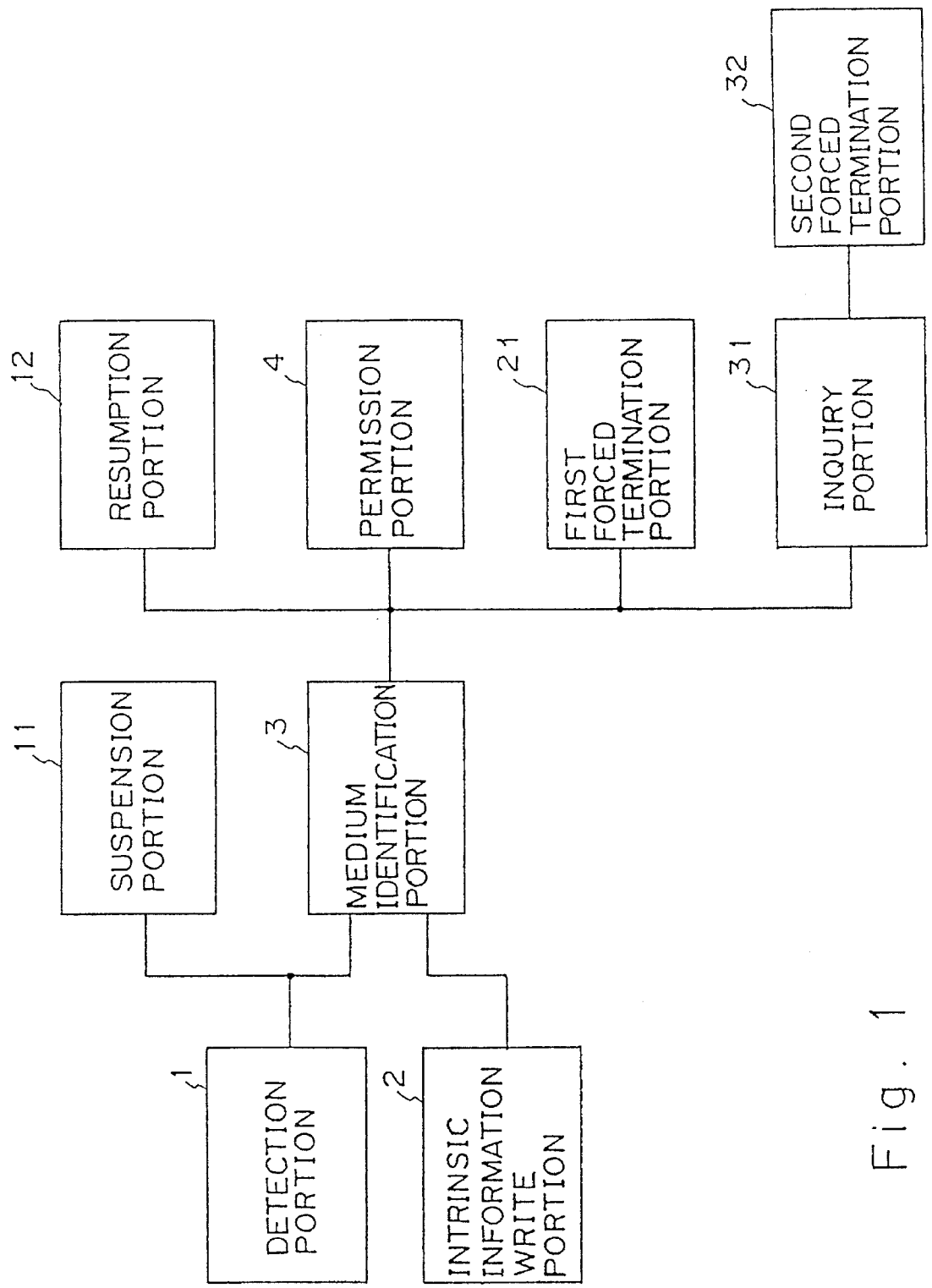
FIG. 1 is a first theoretical block diagram for describing the present invention.

FIG. 1 is a theoretical block diagram of an information processing unit having a medium drive device in which an exchangeable storage medium such as a floppy disk, an optomagnetic disk, or an IC memory card is inserted.

In FIG. 1, a detection portion 1 detects an insertion and a removal of an exchangeable storage medium against a drive device.

An intrinsic information writing portion 2 writes intrinsic information such as current time to a predetermined area of an exchangeable storage medium and memory of the information processing unit when a request for causing the exchangeable storage medium to be used as a file system in the unit is issued. This intrinsic information is not limited to current time. Instead, intrinsic information which takes place in time sequence or which is set on individual exchangeable storage mediums may be used.

When an exchangeable storage medium on which intrinsic information has been written by the intrinsic information writing portion 2 is removed from the drive device, the detection portion 1 notifies a medium identification portion 3 of this information. When the medium identification portion 3 receives this information, it determines whether or not the medium was removed while it was in an I/O accessible state. When the medium was in the I/O accessible state, the medium identification portion 3 stores this determined result. When an exchangeable storage medium is inserted in the drive device, the detection portion 1 detects the insertion and notifies the medium identification portion 3 of this information.

When the medium identification portion 3 receives this notice, it checks whether or not the same intrinsic information as that written in the memory by the intrinsic information writing portion 2 has been written to the predetermined area of the exchangeable storage medium newly inserted so as to determine whether or not the same exchangeable storage medium which was removed is newly inserted in the drive device. The medium identification portion 3 notifies a permission portion 4 of the determined result.

The permission portion 4 permits an I/O process for the exchangeable storage portion being inserted only when the determined result represents that the same medium is inserted in the drive device.

When an exchangeable storage medium which is in an I/O accessible state is removed from the drive device, until this exchangeable storage medium is inserted in the drive device, the permission portion 4 prohibits data I/O process for the exchangeable storage medium which is inserted in the drive device. Thus, even if a different exchangeable storage medium which has not been removed from the drive device is mistakenly inserted therein, data of this different exchangeable storage medium will not be destroyed.

In addition, since intrinsic information is written when an exchangeable storage medium inserted in the drive device is used as a file system in the unit, (not when is initialized as opposed to the conventional systems), for an exchangeable storage medium which was initialized by another unit, the determination of whether the same exchangeable storage medium is inserted can be performed. Thus, for an exchangeable storage medium which was initialized by another unit, the data thereof can be protected. A suspension portion 11 suspends an I/O request which is being processed for an exchangeable storage medium, I/O requests which are queued, and I/O requests which newly take place for the exchangeable storage medium when the detection portion 1 has detected that the exchangeable storage medium was removed from the drive device in an I/O accessible state.

A resumption portion 12 executes I/O requests suspended by the suspension portion 11 in early-to-later order when the medium identification portion 3 has determined that the same exchangeable storage medium removed from the drive device is inserted in the drive device.

Thus, even if the exchangeable storage medium which is in an I/O accessible state is removed from the drive device, when it is inserted in the same drive device, all I/O requests for the exchangeable storage medium can be executed without loss.

A first forced termination portion 21 forcedly terminates I/O requests suspended by the suspension portion 11 if an error takes place when the medium identification portion 3 reads data from the predetermined area of the exchangeable storage medium inserted in the drive device.

Thus, all the queued I/O requests for the storage medium which was removed are dequeued. Thus, when an exchangeable storage medium is removed from the drive device, if data cannot be read from the predetermined area due to for example scratches, the unit can continue the process without necessity of rebooting sequence.

An inquiry portion 31 inquires of the user whether to terminate the determination process of the exchangeable storage medium by the medium identification portion 3 by using for example a message when the medium identification portion 3 has determined that an exchangeable storage medium which is different from one which was removed from the drive device in an I/O accessible state is newly inserted therein.

A second forced termination portion 32 forcedly terminates both the determination process of the medium identification portion 3 and I/O requests suspended by the suspension portion 11 when the user replied the permission of the termination of the determination process corresponding to the inquiry by the inquiry portion 31.

Thus, when an exchangeable storage medium which was removed from the drive device in an I/O accessible state cannot be found, the user can cancel the I/O request for the exchangeable storage medium. Thus, another storage medium can be processed without a rebooting sequence of the unit.

Figure 2:
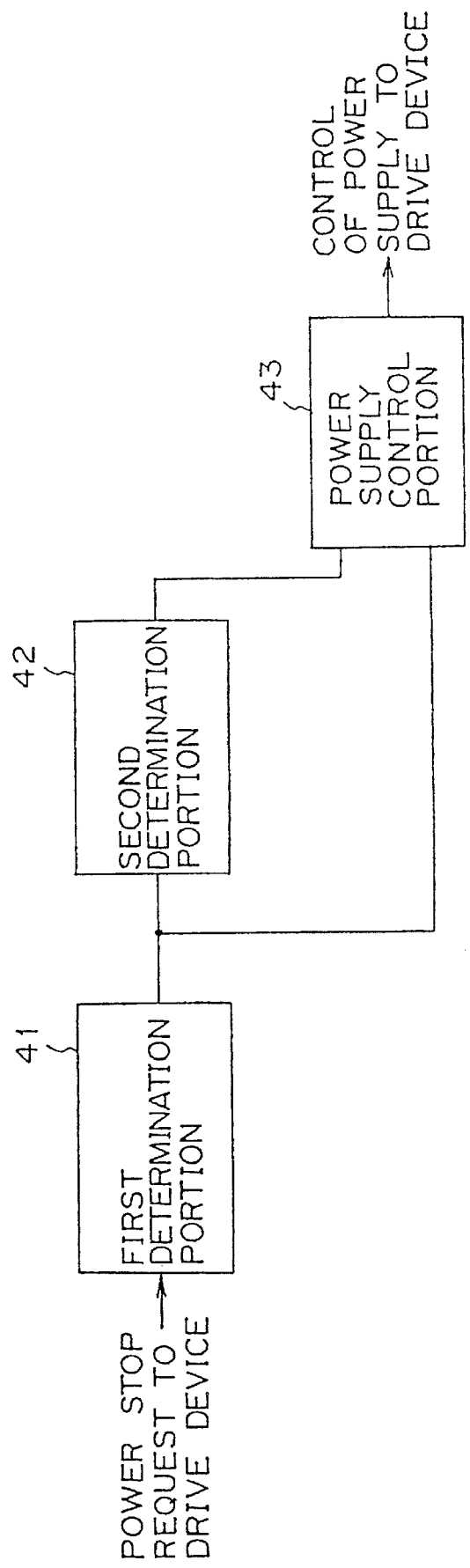
FIG. 2 is a second theoretical block diagram for describing the present invention.

FIG. 2 is a second theoretical block diagram for explaining the present invention.

In FIG. 2, a first determination portion 41 determines whether or not an exchangeable storage medium inserted in a drive device can be used in the information processing unit as a file system when a power supply stop request for the drive device takes place.

The second determination portion 42 determines whether or not the exchangeable storage medium is in an I/O accessible state when the first determination portion 41 has determined that the exchangeable storage medium is in an operable state in the information processing unit.

A power supply control portion 43 determines whether or not the supply of electric power to the drive device can be stopped corresponding to the determined results of the first determination portion 41 and the second determination portion 42.

For example, the power supply control portion 43 causes the exchangeable storage medium to be in an inoperable state in the unit and stops the supply of electric power to the drive device when the first determination portion 41 has determined that the exchangeable storage medium is in an operable state in the unit and the second determination portion 42 has determined that the exchangeable storage medium is not in an I/O accessible state.

However, the power supply control portion 43 does not stop the supply of electric power to the drive device when the second determination portion 42 has determined that the exchangeable storage medium is in the I/O accessible state.

In addition, the power supply control portion 43 stops the supply of electric power to the drive device when the first determination portion 41 has determined that the exchangeable storage medium is not in an operable state in the information processing unit as a file system.

As described above, if a power supply stop request for the drive device takes place, when a exchangeable storage medium is in an I/O accessible state, the request is not executed. Only when the exchangeable storage medium is in an inoperable state as a file system in the unit, the power supply control portion 43 stops the supply of electric power to the drive device. Thus, while the power supply is stopped, even if an exchangeable storage medium is changed to a different one, after the power supply is resumed, the data of the different exchangeable storage medium is not destroyed.

Figure 3:
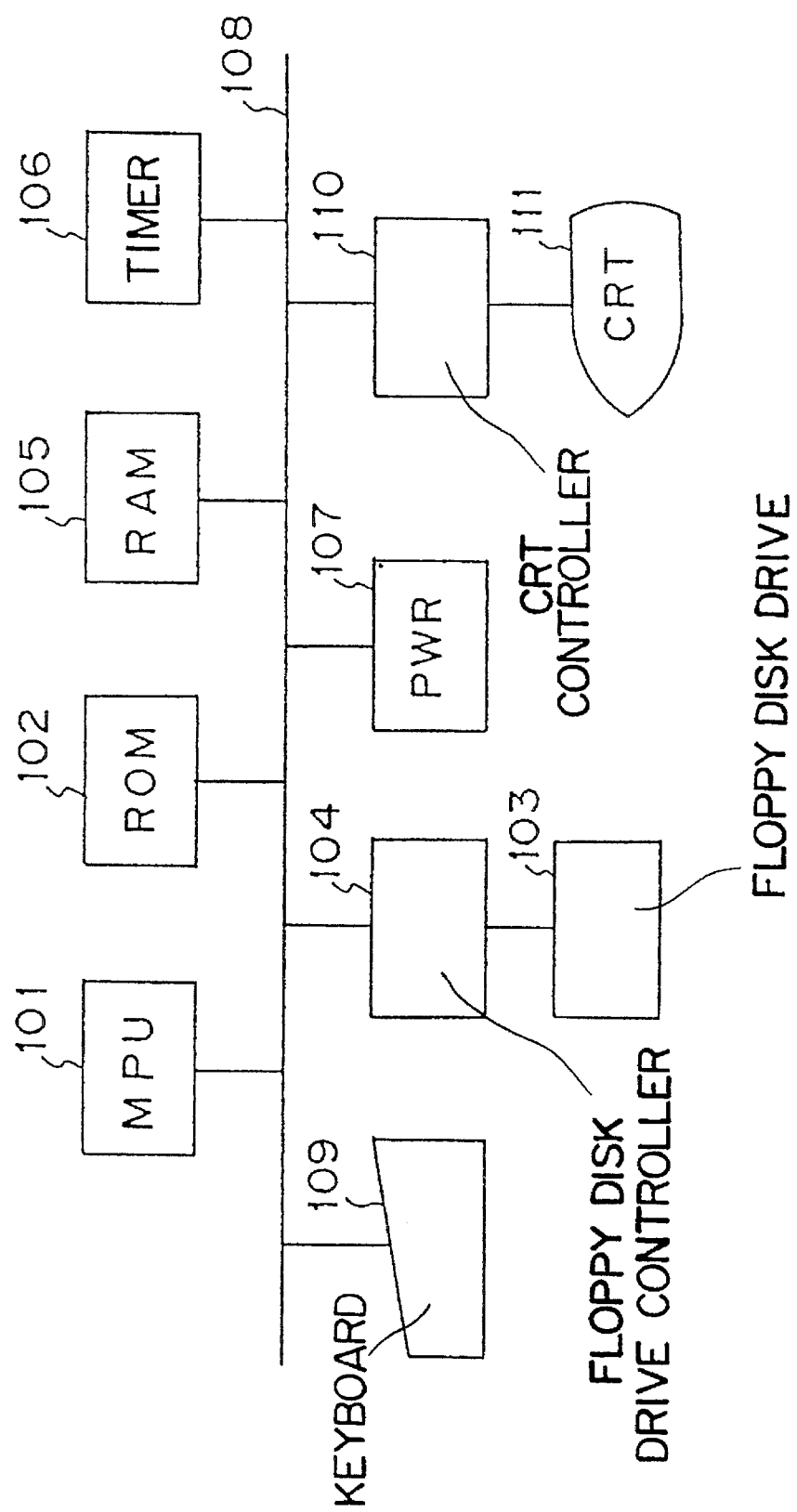
FIG. 3 is a block diagram showing the system construction of an information processing unit according to an embodiment of the present invention.

FIG. 3 is a block diagram showing the construction of an information processing unit according to an embodiment of the present invention.

In FIG. 3, reference numeral 101 is a micro-processing unit (MPU). The MPU 101 executes an operating system (OS) and various application programs stored in a read-only memory (ROM) 102 under the control of for example micro-programs. The MPU 101 controls the entire system and performs various processes with respect to data protection of a floppy disk, which is an exchangeable storage medium.

Reference numeral 103 is a floppy disk drive (FDD). The FDD 103 reads and writes data from and to a floppy disk inserted therein and detects whether the floppy disk is inserted and removed therein and therefrom. The FDD 103 sends a detected signal to a floppy disk controller (FDC) 104 which is a drive device for the floppy disk.

To reduce power consumption, when the user issues a predetermined command, a power supply portion (PWR) 107 stops supplying electric power to the FDD 103 and FDC 104.

Reference numeral 104 is a floppy disk controller (FDC). The FDC 104 initializes a floppy disk inserted in the FDD 103, creates a file on the floppy disk, and reads and writes data from and to the file corresponding to various control signals received from the MPU 101. When the FDC 104 receives a signal representing an insertion or a removal of a floppy disk, it sends the signal as an interrupt signal to the MPU 101.

Reference numeral 105 is a random access memory (RAM). The RAM 105 is a memory which is used as a system memory area, a memory area, and so forth. The system memory area is used as a storage area and a work area of the OS. The memory area is used as a storage area and a work area of various application programs. Data can be read and written from and to the RAM 105.

Reference numeral 106 is a timer (TMR). For example, the TMR 106 is of a built-in battery type. The TMR 106 counts current time (year, month, day, hour, minute, and second). The time information of the TMR 106 is accessed by the MPU 101.

Reference numeral 107 is a power supply portion (PWR). The PWR 107 supplies electric power to the MPU 101, the ROM 102, the RAM 105, the FDC 104, and the FDD 103 and so on. The PWR 107 supplies electric power to the FDC 104 and the FDD 103 under the control of the MPU 101.

The ROM 102, the RAM 105, and the FDC 104 are connected directly to the MPU 101 through a bus 108.

In addition, a keyboard (KB) 109, a CRT display (CRT) 111, and a CRT controller (CRTC) 110 are also connected to the MPU 101 through the bus 108. The KB 109 serves to input commands and data. The CRT 111 displays echo backs of key entries, response messages corresponding to key-entered commands of the user, and so forth. The CRTC 110 controls the display of the CRT 111.

In this embodiment, as an exchangeable storage medium, a floppy disk is used. Thus, if another type of an exchangeable storage medium were used, a controller and a drive device which correspond thereto should be used.

Figure 4:
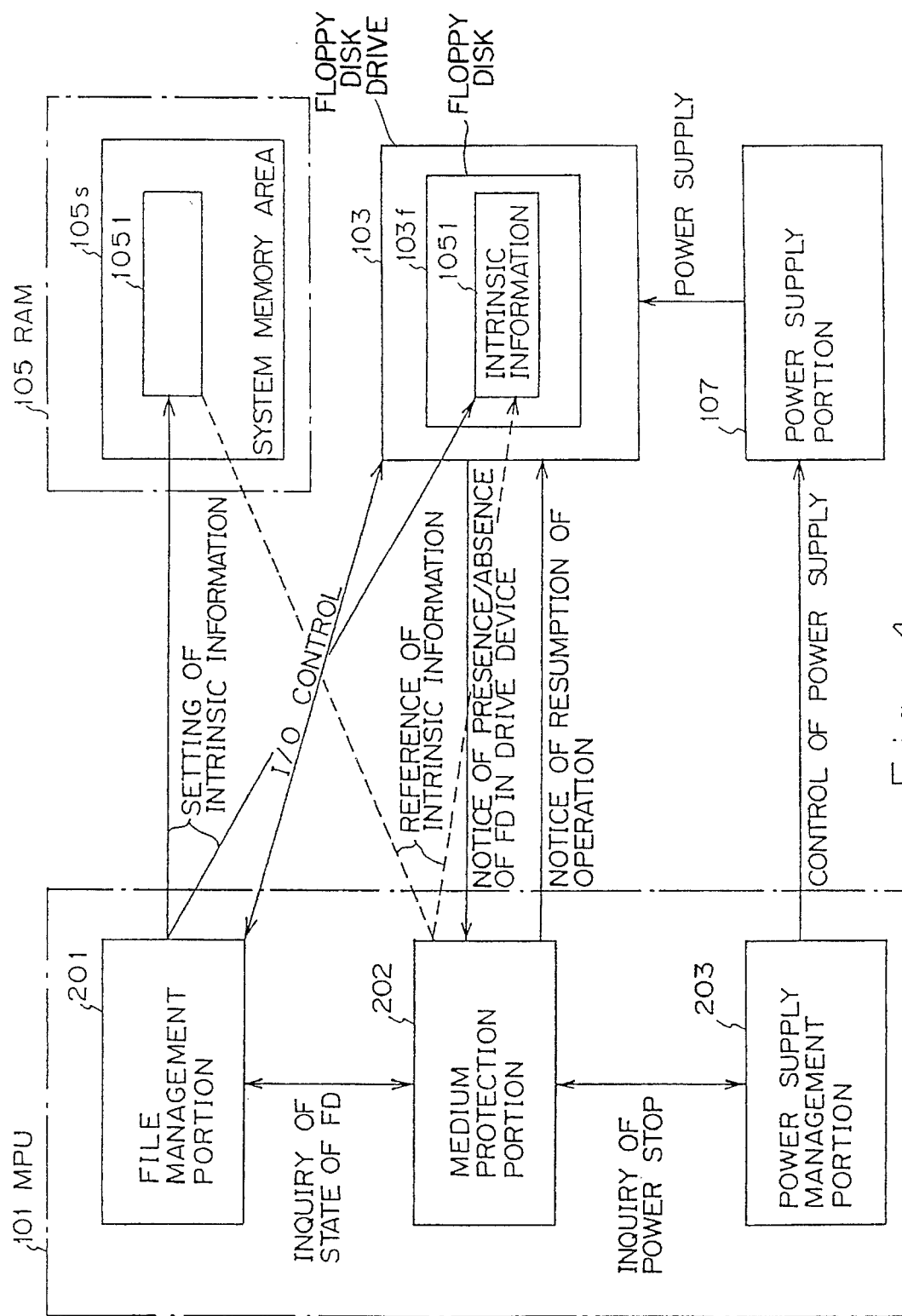
FIG. 4 is a schematic diagram for explaining the construction and operation of principal portions of the embodiment of FIG. 3.

FIG. 4 is a schematic diagram for explaining the construction and operation of principal portions of the embodiment of the present invention.

In FIG. 4, reference numeral 201 is a file management portion. Reference numeral 202 is a medium protection portion. Reference numeral 203 is a power supply management portion. These portions 201, 202, and 203 are functional blocks. These blocks are accomplished by the MPU 101 when it executes subsystems which are part of the OS stored in the ROM 102.

The file management portion 201 comprises the intrinsic information writing portion 2 shown in FIG. 1 and the first forced determination portion 41 and second forced determination portion 42 shown in FIG. 2. The file management portion 201 performs a mounting process and an unmounting process. In the mounting process, the file management portion 201 causes a floppy disk (FD) 103f which is inserted in the FDD 103 to be in an operable state as a file system in the unit. In the unmounting process, the file management portion 201 causes the floppy disk (FD) 103f which is inserted in the FDD 103 to be in an inoperable state in the unit. When the file management portion 201 performs the mounting process, it writes intrinsic information 1051 to a predetermined area of a system memory area 105s of the RAM 105. The intrinsic information 1051 is identification information used for protecting data of the floppy disk 103f. In addition, the file management portion 201 writes the intrinsic information 1051 to a predetermined area of the floppy disk 103f. In this embodiment, as the intrinsic information 1051, time information (year, month, day, hour, minute, and second) counted by the timer 106 is used. The file management portion 201 determines whether or not a floppy disk inserted in the FDD 103 is in an operable state as a file system by a mounting table. In addition, the file management portion 201 determines whether or not all files created on the floppy disk inserted in the FDD 103 are opened and in an I/O accessible state corresponding to a file table.

The medium protection portion 202 has a part of the detection portion 1 shown in FIG. 1. The medium protection portion 202 determines whether or not a floppy disk 103f is inserted in the FDD 103 corresponding to an interrupt signal received from the FDC 104 and sends the determined result to the file management portion 201.

The medium protection portion 202 also has the medium identification portion 3 and the permission portion 4. When a floppy disk 103f inserted in the FDD 103 is removed therefrom in an I/O accessible state and a floppy disk 103f' (which may not be the same as the floppy disk 103f) is inserted therein, the medium protection portion 202 compares intrinsic information 1051 stored in the system memory area 105s with intrinsic information written on the floppy disk 103f' so as to determine whether these floppy disks are the same. When they match, the medium protection portion 202 determines that the floppy disk 103f which was removed is inserted and allows the floppy disk 103f' to be I/O accessed.

The medium protection portion 202 further has the suspension portion 11 and the resumption portion 12. When the medium protection portion 202 detects a removal of the floppy disk 103f from the FDD 103 in the I/O accessible state, the medium protection portion 202 suspends an I/O request being executed for the floppy disk 103f and I/O requests being queued. When the medium protection portion 202 detects an insertion of the floppy disk 103, it resumes the execution of such I/O requests.

The medium protection portion 202 also includes the inquiry portion 31, the first forced termination portion 21, and the second forced termination portion 32. The inquiry portion 31 inquires of the user whether to terminate the determination process for determining whether or not the floppy disk 103f' newly inserted in the FDD 103 is the same as the floppy disk 103f which was removed therefrom by using a message displayed on the CRT 111. The second forced termination portion 32 terminates the determination process for the floppy disk 103f' and the suspended I/O requests corresponding to the user's reply which is input from the keyboard KB 109. The first forced termination portion 21 immediately terminates the determination process for the floppy disk 103f' and the suspended I/O requests when an error takes place in reading intrinsic information 1051 stored in the floppy disk 103f'.

The medium protection portion 202 also has the power supply control portion 43 shown in FIG. 2. The power supply control portion 43 determines whether to allow the power supply management portion 203 to supply electric power to the FDC 104 and the FDD 103 and sends the determined result to the power supply management portion 203.

In addition to the above-described functions of these portion, the medium protection portion 202 has a function for inquiring of the file management portion 201 the present state of the floppy disk 103f (namely, whether the floppy disk 103f inserted in the FDD 103 is in an operable state as a file system in the unit). When the floppy disk 103f is in the operable state, the medium protection portion 202 inquires of the file management portion 201 whether or not the floppy disk 103f is in an I/O accessible state.

The power supply management portion 203 controls the power supply of the power supply portion 107 for the FDC 104 and the FDD 103. In other words, the power supply management portion 203 controls the supply and stop of electric power of the power supply portion 107 to the FDC 104 and the FDD 103 corresponding to the determined result against the inquiry by the medium protection portion 202.

The FDD 103 has a sensor which detects whether a floppy disk 103f is inserted thereto or removed therefrom. Whenever a floppy disk 103f is inserted or removed, the FDD 103 sends this information to the medium protection portion 202 through the FDC 104.

The power supply portion 107 is a power supply which supplies electric power for driving the FDC 104 and the FDD 103. Next, a file system which is a group of files created on a floppy disk 103f will be described.

Figure 5:
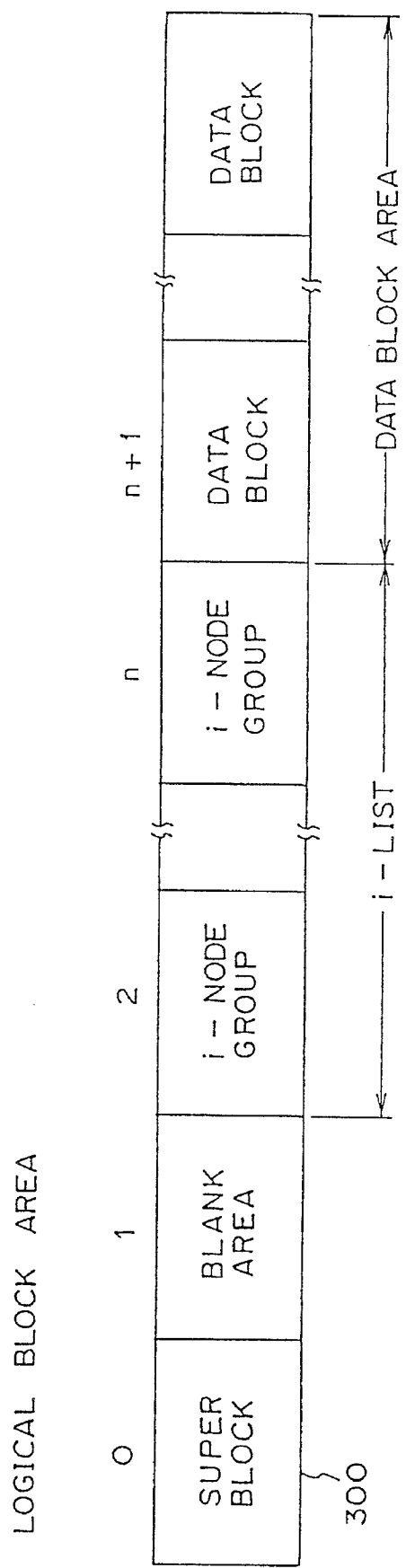
FIG. 5 is a schematic diagram showing the construction of a file system formed on a floppy disk.

FIG. 5 is a schematic diagram for explaining the construction of the file system.

A file is constructed of a plurality of logical blocks each of which consists of 1024 bytes. These logical blocks are simply referred to as logical blocks. These logical blocks are designated logical block numbers "0", "1", . . . , "n", and "n+1" in early-to-later order.

A block with logical block number "0" is referred to as super block 300. The super block 300 stores file system information (such as the size of a file system, the length of each block, and the size of i-list and so on) and other information for managing file systems (such as blank data blocks).

Normally, the next block, which is logical block number "1", is a blank area.

In blocks from logical block numbers "2" to "n", a plurality of i-nodes (i-node group) are stored. The (n−1) i-node group construct an i-list 400.

An i-node is created for each file. On a floppy disk 103f, a number of files corresponding to the total number of i-nodes in the i-list may be created. Each i-node stores information such as data block, type, and size of the corresponding file.

Blocks after the logical block number "n+1" following the i-list 400 are data blocks which store data of each file. A group of these data blocks construct a data block area 500.

Figure 6:
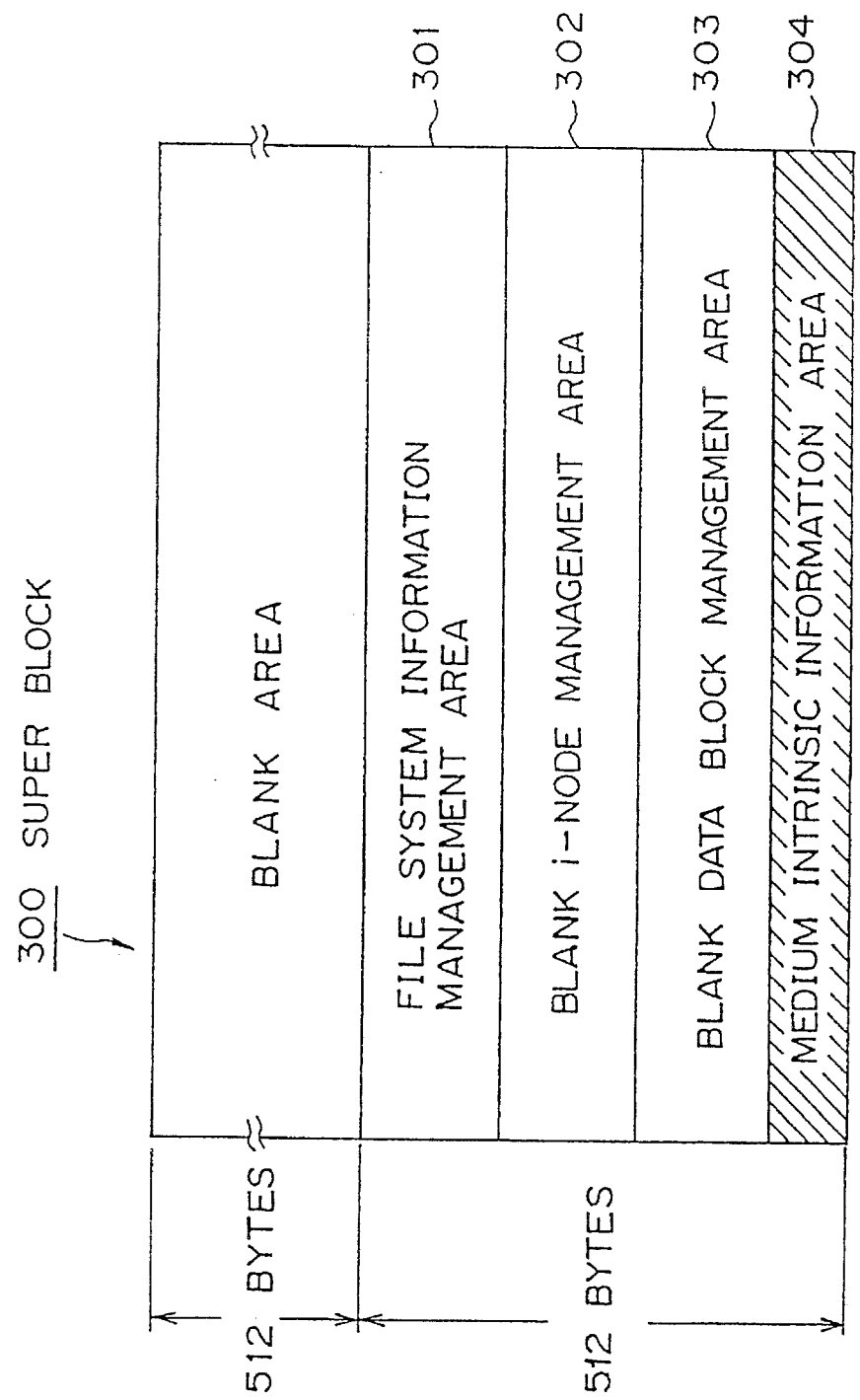
FIG. 6 is a schematic diagram showing the construction of a super block.

FIG. 6 is a schematic diagram showing the construction of the super block 300.

The first 512 bytes of the super block (1024 bytes) are a blank area. The last 512 bytes of the super block include a file system information management area 301, a blank i-node management area 302, and a blank data block management area 303. The file system information management area 301 serves to store the file system information. The blank i-node management area 302 serves to manage information of blank i-nodes in the i-list 400. The blank data block management area 303 serves to manage information of blank data blocks in the data block area 500. At the last end of the super block 300 following the blank data block management area 303, a medium intrinsic information area 304 for storing the intrinsic information 1051 used for data protection of the floppy disk 103f inserted in the FDD 103 is disposed.

Next, the operation of the information processing unit in the above-described construction will be described.

Figure 7:
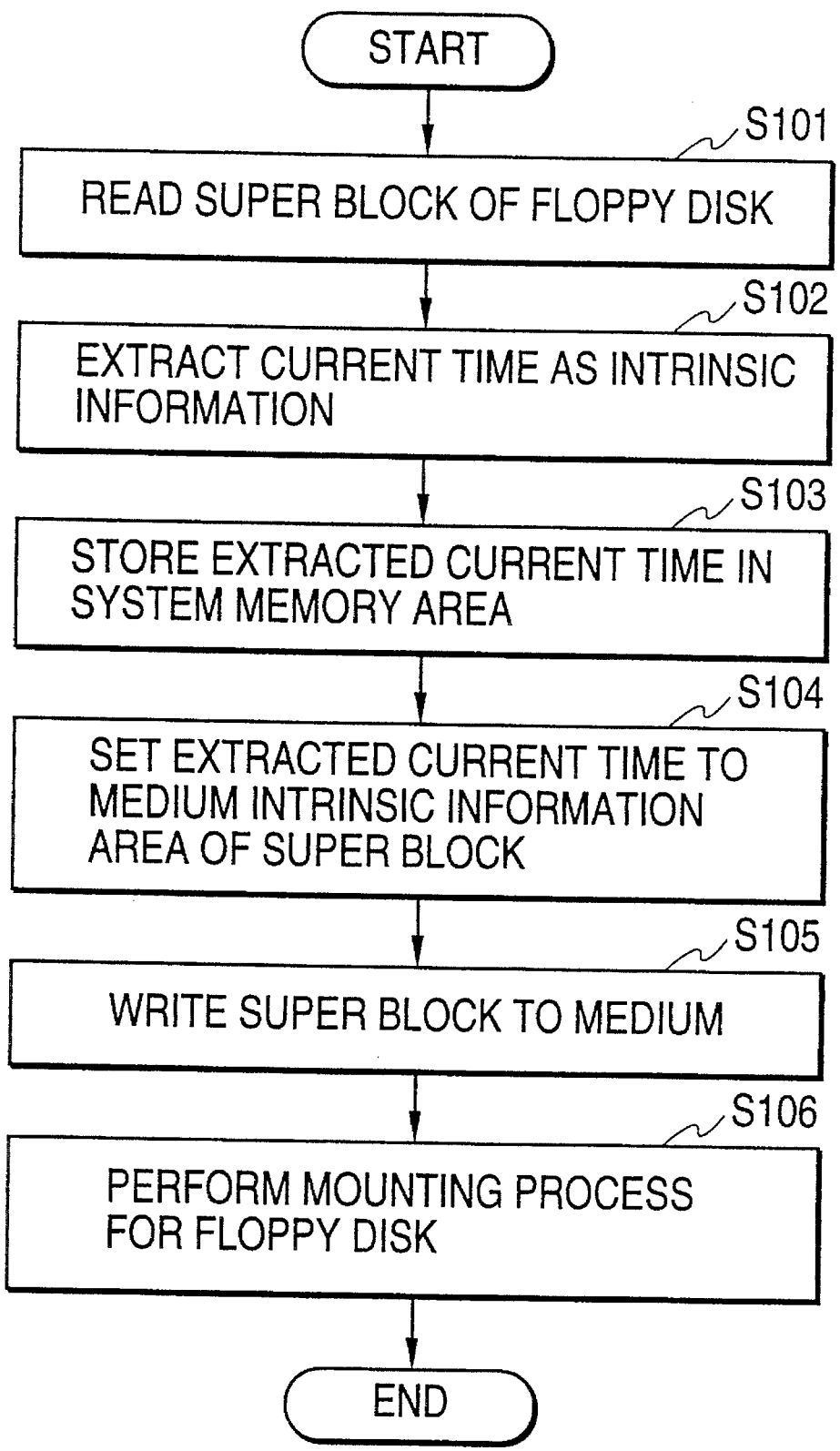
FIG. 7 is a flow chart for explaining the operation of a file management portion for designating an intrinsic information to a floppy disk.

When the file management portion 201 receives a mounting operation request, it performs the mounting process which causes the floppy disk 103f to be in an operable state as a file system in the unit according to a flow chart shown in FIG. 7.

The file management portion 201 reads the contents of the super block 300 (see FIG. 6) of the floppy disk 103f through the FDC 104 and writes them to the system memory area 105s of the RAM 105 (at step S101).

Next, the file management portion 201 reads current time information (year, month, day, minute, hour, and second), which is intrinsic information 1051, from the timer 106 (at step S102) and writes the time information to the system memory area 105s of the RAM 105 (at step S103).

Then, the file management portion 201 sets the current time to the medium intrinsic information area 304 (see FIG. 6) of the super block 300 (at step S104) and writes the super block 300 to the storage area on the floppy disk 103f through the FDC 104 (at step S105).

Thus, the current time is written to the medium intrinsic information area 304 of the super block 300 on the floppy disk 103f inserted in the FDD 103 as the intrinsic information 1051 for identifying the floppy disk 103f from the other floppy disk 103f'.

After the intrinsic information 1051 of the floppy disk 103f has been written, the file management portion 201 registers the floppy disk 103f to the unit and performs the mounting process for allowing the floppy disk 103f to be in an operable state as a file system in the system (at step S106). Thereafter, the process sequence is completed.

Thus, according to the occurrence of the mounting request, the floppy disk 103f inserted in the FDD 103 can be operated as a file system in the unit. In addition, the intrinsic information 1051 is written to the super block 300 of the floppy disk 103f.

Next, with reference to a flow chart shown in FIG. 8, the operation of the present invention in the case where a floppy disk is removed from the FDD 103 will be described.

When the medium protection portion 202 had detected a removal of the floppy disk 103f from the FDD 103 (at step S201), it causes the device driver of the FDD 103 to suspend an I/O request being processed for the floppy disk 103f and all I/O requests being queued (at step S202) and then stops the process of the device driver (at step S203).

Next, the medium protection portion 202 references a file table (not shown) of the system memory 105s and determines whether or not there is an open file on the floppy disk 103f (at step S204). When there is no open file on the floppy disk 103f, the medium protection portion 203 cancels the stop of the device driver and causes the device driver to resume its process (at step S212). Thereafter, the process sequence is completed.

When there is an open file on the floppy disk 103f removed, the medium protection portion 202 waits until the floppy disk 103f is inserted in the FDD 103 (at step S205).

When the medium protection portion 202 receives an interrupt signal representing that the floppy disk 103f is inserted in the FDD 103 from the FDC 104 (YES at the step S205), it reads the super block 300 of the floppy disk 103f inserted in the FDD 103 through the FDC 104 (at step S206).

Next, the medium protection portion 202 determines whether or not an I/O error took place in reading the super block 300 corresponding to the response status of the FDC 104 (at step S207). When the super block 300 was correctly read (NO at the step S207), the medium protection portion 202 compares the intrinsic information (time) 105 stored in the predetermined area of the system memory 105s of the RAM 105 with the intrinsic information (time) 1051' stored in the medium intrinsic information area 304 of the super block 300 being read (at step S208). When they match namely, the medium protection portion 202 has determined that the floppy disk 103f removed from the FDD 103 at the step S201 is inserted in the FDD 103, it causes the device driver to cancel the suspension of the I/O requests (at step S209) so that the device driver resumes the execution of the I/O requests (at step S212).

When the medium protection portion 202 has determined that the different floppy disk 103f' rather than the floppy disk 103f which was removed from the FDD 103 is inserted therein, it outputs a warning message which informs the user that the incorrect floppy disk 103f' is inserted in the FDD 103 to the CRT 111 through the CRT controller 110. In addition, the medium protection portion 202 outputs a message which inquires of the user whether to forcedly terminate the medium identification determination process (from steps S205 to S208) (at step S210).

When the user inputs the response which permits the forced termination from the keyboard KB 109, the medium protection portion 202 causes the device driver to cancel all the suspended I/O requests for the floppy disk 103 which was removed from the FDD (at step S211) and forcedly terminates the determination process to resume the process of the device driver (at step S212).

When the user inputs a response which denies the forced termination of the medium identification determination process from the keyboard, the medium determination portion 202 returns the control to the step S205, resumes the medium identification determination process, and waits until an insertion of the floppy disk 103f in the FDD 103 is detected.

When the medium protection portion 202 receives information which represents that an input error took place from the FDC 104 at the step S207, it causes the device driver to perform the process of the steps S211 and S212 (namely, causes the device driver to cancel the I/O requests being suspended and forcedly terminates the determination process of the same medium (at step S211) and then causes the device driver to resume the process (at step S212)).

Next, with reference to a flow chart shown in FIG. 9, the operation in the case that a power supply stop request for the FDC 104 and the FDD 103 takes place will be described.

When the power supply management portion 203 has detected an occurrence of a power supply stop request for the FDC 104 and the FDD 103 due to a user's command entry from the keyboard KB 109 (at step S301), it inquires of the medium protection portion 202 whether or not the power supply stop request took place. When the medium protection portion 202 receives this inquiry, it inquires of the file management portion 201 whether or not the floppy disk 103f is inserted in the FDD 103, mounted, and is in an operable state as a file system in the unit (at step S302).

When the medium protection portion 202 receives a response representing that the floppy disk 103f is in an operable state as a file system in the unit from the file management portion 201, it inquires of the file management portion 201 whether or not there is an open file on the floppy disk 103f (at step S303).

When the medium protection portion 202 receives a reply representing that there is no open file on the floppy disk 103f from the file management portion 201, it causes the file management portion 201 to perform an unmounting operation for the floppy disk 103f (at step S304). Thus, the file management portion 201 performs the unmounting operation for the floppy disk 103f and thereby the floppy disk 103f becomes in an inoperable state in the unit. Next, the medium protection portion 202 allows the power supply management portion 203 to stop the supply of electric power to the FDC 104 and the FDD 103 (at step S305). Thus, the power supply management portion 203 causes the power supply portion 107 to stop supplying electric power to the FDC 104 and the FDD 103 (at step S306). As a result, the supply of electric power to the FDC 104 and the FDD 103 is stopped.

Therefore, in the case that the floppy disk 103f which is in an operable state as a file system in the unit is inserted in the FDD 103, when a power supply stop request for the FDC 104 and the FDD 103 takes place and all files on the floppy disk 103f are closed, even if the supply of electric power to the FDC 104 and the FDD 103 is stopped, data of the files on the floppy disk 103f is not destroyed. Thus, the supply of electric power to the FDC 104 and the FDD 103 can be immediately stopped.

When the medium protection portion 202 receives a reply representing that there is an open file on the floppy disk 103f from the file management portion 201 at the step S303, it sends a notice representing that the power supply stop request for the FDC 104 and the FDD 103 is not permitted to the power supply management portion 203. When the power supply management portion 203 receives this notice, it prohibits the power supply portion 107 from stopping the supply of electric power to the FDC 104 and the FDD 103 (at step S307).

When the floppy disk 103f inserted in the FDD 103 is mounted in an operable state as a file system in the unit and there is an open file thereon, if the supply of electric power to the FDC 104 and the FDD 103 is stopped, data of the open file may be destroyed. In addition, after the supply of electric power to the FDC 104 and the FDD 103 is resumed, if a different floppy disk is inserted in the FDD 103, data thereof may be destroyed. Thus, in this case, even if there is a power supply stop request for the FDC 104 and the FDD 103, the medium protection portion 202 does not permit the power supply stop request.

When the medium protection portion 202 receives a notice representing that the floppy disk 103f is not inserted in the FDD 103 or the floppy disk 103f inserted in the FDD 103 is not mounted from the file management portion 201, it causes the power supply management portion 203 to perform the process of the steps S305 and S306 so as to stop the supply of electric power to the FDC 104 and the FDD 103.

When a floppy disk 103f is not inserted in the FDD 103 or a floppy disk 103f which is inserted therein is not in an operable state as a file system in the unit, even if the supply of electric power to the FDC 104 and the FDD 103 is stopped, data of the floppy disk 103f is not destroyed. In addition, after the supply of electric power is resumed, even if a different floppy disk 103f is inserted in the FDD 103 and then mounted, data of the floppy disk 103f is not destroyed. Thus, the supply of electric power to the FDC 104 and the FDD 103 can be immediately stopped.

Next, with reference to a flow chart shown in FIG. 10, the operation performed between the device driver of the FDD 103 which operates with the OS and the medium protection portion 202 will be described.

This device driver normally waits for an interrupt from the FDC 104 against the MPU 101. In addition, the device driver waits for a notice representing cancellation of suspended I/O requests for the floppy disk 103f inserted in the FDD 103 from the medium protection portion 202 (at step S1001).

The device driver is activated when such an interrupt takes place or such a notice is received. After the device driver is activated, it determines whether or not it was activated by which of the interrupt and the notice (at step S1002).

There are two types of interrupts. One interrupt is issued when the floppy disk 103f is inserted in the FDD 103. The other interrupt is issued when the floppy disk 103f is removed from the FDD 103. When the device driver receives the former interrupt caused by an insertion of the floppy disk 103f in the FDD 103, it immediately notifies the medium protection portion 202 of this interrupt (at step S1003).

Figure 8:
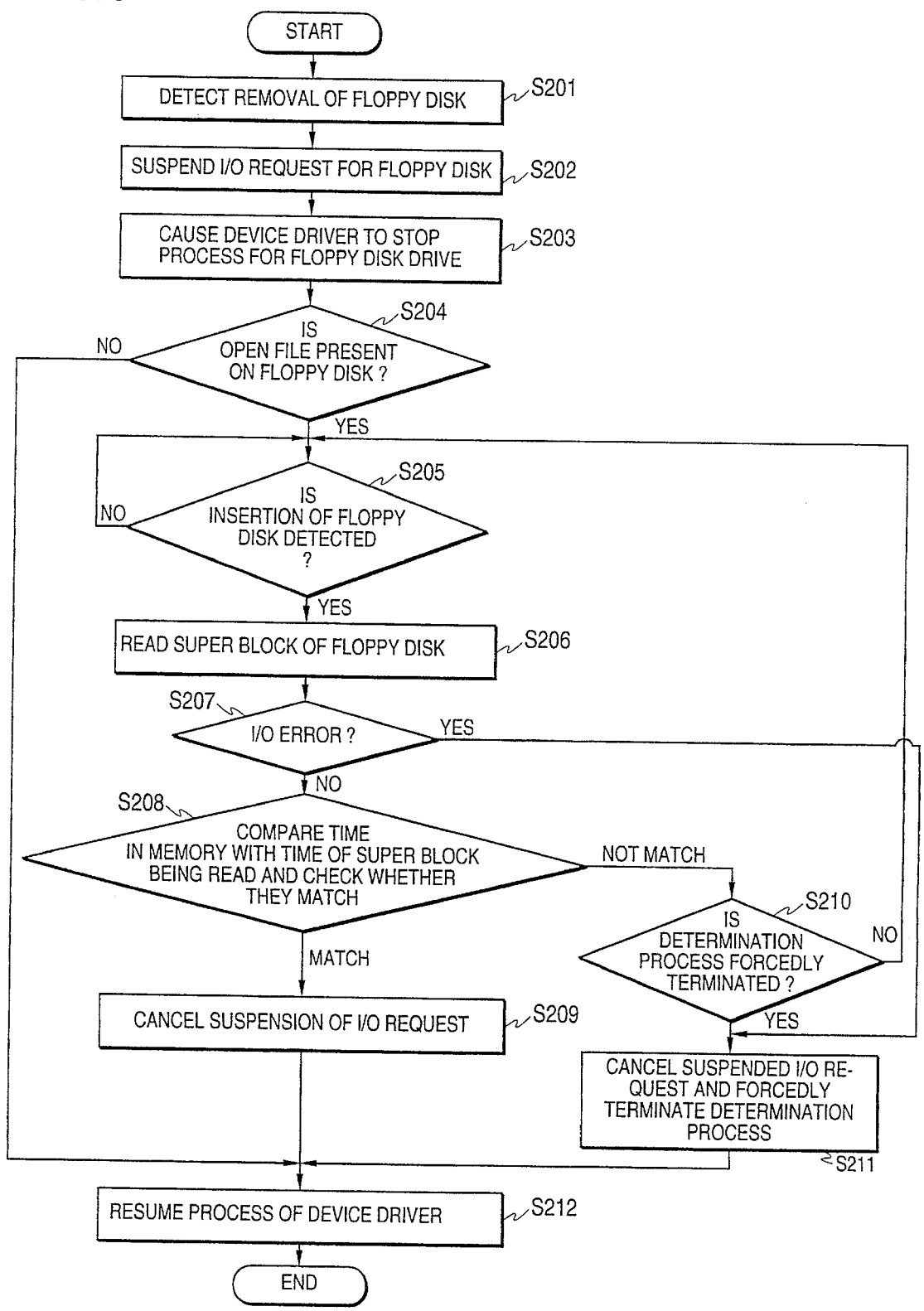
FIG. 8 is a flow chart for explaining an operation in the case where a floppy disk is removed from an FDD.

The process sequence from the steps S1001>S1002>S1003 accord with the process of the step S205 shown in FIG. 8.

When the device driver receives the latter interrupt caused by a removal of the floppy disk 103f from the FDD 103, it suspends all I/O requests being queued for the floppy disk 103f (at step S1004) and then notifies the medium protection portion 202 that the floppy disk 103f was removed from the FDD 103 (at step S1005).

The process sequence of the steps S1001>S1002>S1004>S1005 accord with the process of the steps S201 to S203 of the flow chart shown in FIG. 8.

When the device driver receives a notice representing that suspension of the I/O requests for the FDD 103 can be canceled from the medium protection portion 202 at the step S1002, it successively executes the suspended I/O requests for the floppy disk 103f due to its removal at the step S1004 and the I/O requests being queued (at step S1006).

The process sequence of the steps S1001>S1002>S1006 accord with the process of the steps S209>S212 of the flow chart shown in FIG. 8.

As will be described later, since the medium protection portion 202 sends a notice representing the cancellation of suspended I/O requests only when the floppy disk 103f is removed from the FDD 103 and then the same floppy disk 103f rather than a different floppy disk 103f is inserted in the FDD 103. Thus, the device driver can execute all the I/O requests for the floppy disk 103f suspended at the step S1004 and all queued I/O requests which newly take place.

After the process of the step S1003, S1005, or S106 is completed, the device driver returns the control to the step S1001 and waits for an interrupt from the FDC 104 or a notice from the medium protection portion 202.

Next, with reference to a flow chart shown in FIG. 11, the operation performed between the power supply management portion 203 and the medium protection portion 202 will be described.

For example, when the user inputs a power-off command from the keyboard KB 109, the power supply management portion 203 is activated. Thus, the power supply management portion 203 notifies the medium protection portion 202 of a power supply stop request (at step S1011) and waits for a reply to the notice from the medium protection portion 202 (at step S1012).

When the medium protection portion 202 issues a response, the power supply management portion 203 is activated. Thus, the power supply management portion 203 determines the type of the response (at step S1013). When the response represents the permission of the power supply stop request of the power supply portion 107 to the FDC 104 and the FDD 103, the power supply management portion 203 immediately controls the power supply portion 107 and causes the power supply portion 107 to stop the supply of electric power to the FDC 104 and the FDD 103 (at step S1014).

Figure 9:
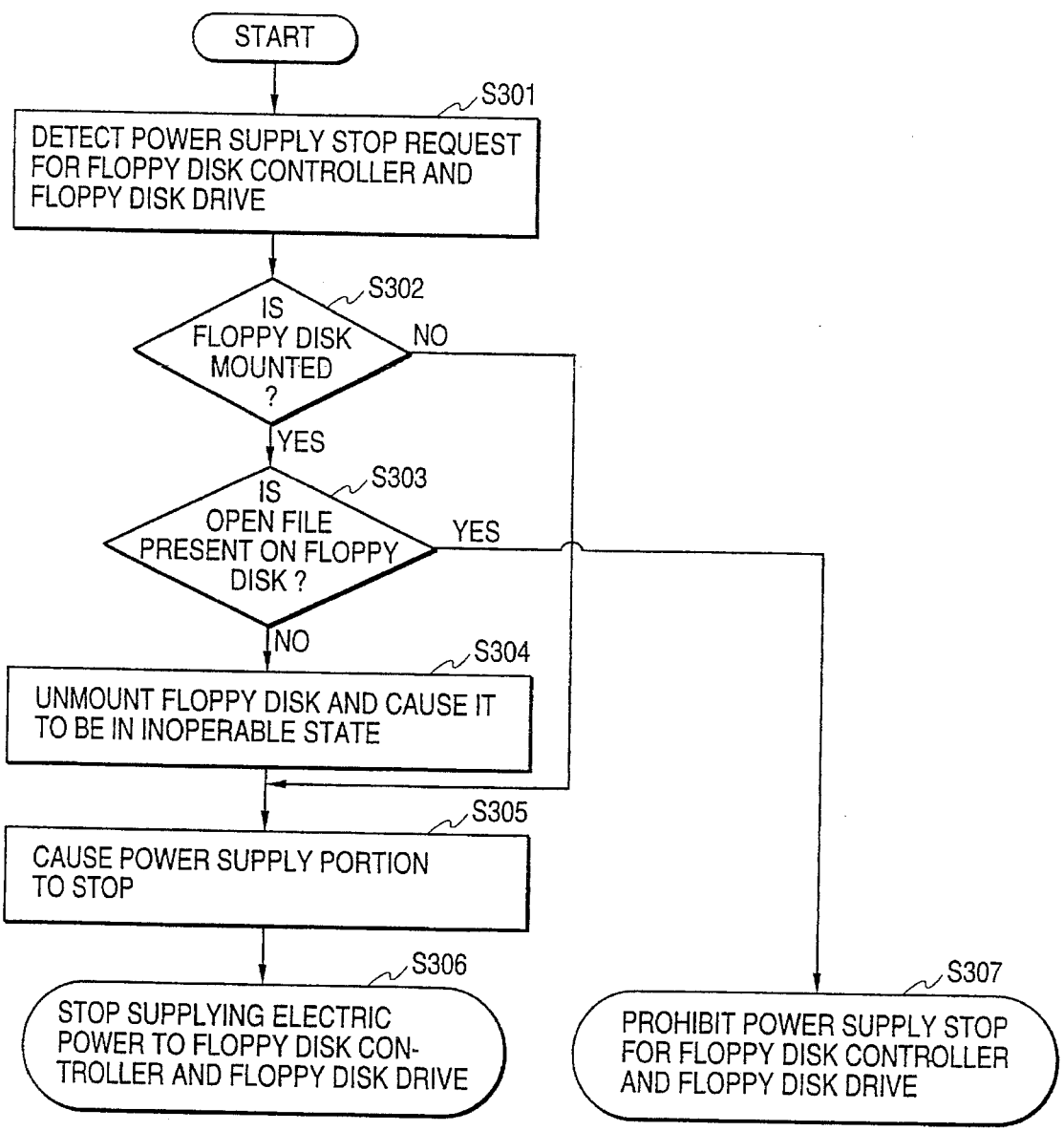
FIG. 9 is a flow chart for explaining an operation in the case where a power stop request for an FDC and FDD is issued.

This process sequence accords with the process of the steps S305>S306 in the flow chart shown in FIG. 9.

When the medium protection portion 202 issues a reply representing the prohibition of the power supply to the FDC 104 and the FDD 103 at the step S1013, the process immediately stops.

This process accords with the process of the step S307 of the flow chart shown in FIG. 9.

When the user inputs a power-off command from the keyboard and thereby the power supply management portion 203 receives a notice representing a power supply stop request, it inquires of the medium protection portion 202 whether the supply of electric power to the FDC 104 and the FDD 103 can be stopped. Thereafter, the power supply management portion 203 determines whether to stop the supply of electric power to the FDC 104 and the FDD 103 corresponding a reply from the medium protection portion 202.

Next, with reference to a flow chart shown in FIG. 12, the operation of the medium protection portion 202 will be described.

The medium protection portion 202 normally waits for a notice from the device driver of the FDD 103 or the power supply management portion 203 (in other words, the medium protection portion 202 is normally in a wait state) (at step S1041).

When the medium protection portion 202 receives a notice, it is activated. Thus, the medium protection portion 202 determines the type of the notice (at step S1042).

When the medium protection portion 202 receives a notice representing that the floppy disk 103*f* is removed from the FDD 103 from the device driver, it inquires of the file management portion 201 whether or not there is an open file on the floppy disk 103*f* (at step S1043). When the medium protection portion receives a reply representing that there is no open file on the floppy disk 103*f* from the file management portion 201, it notifies the device driver of the cancellation of suspended I/O requests for the FDD 103 (at step S1046) and returns the control to the step S1041 (namely, the medium protection portion 202 waits for a notice).

Figure 10:
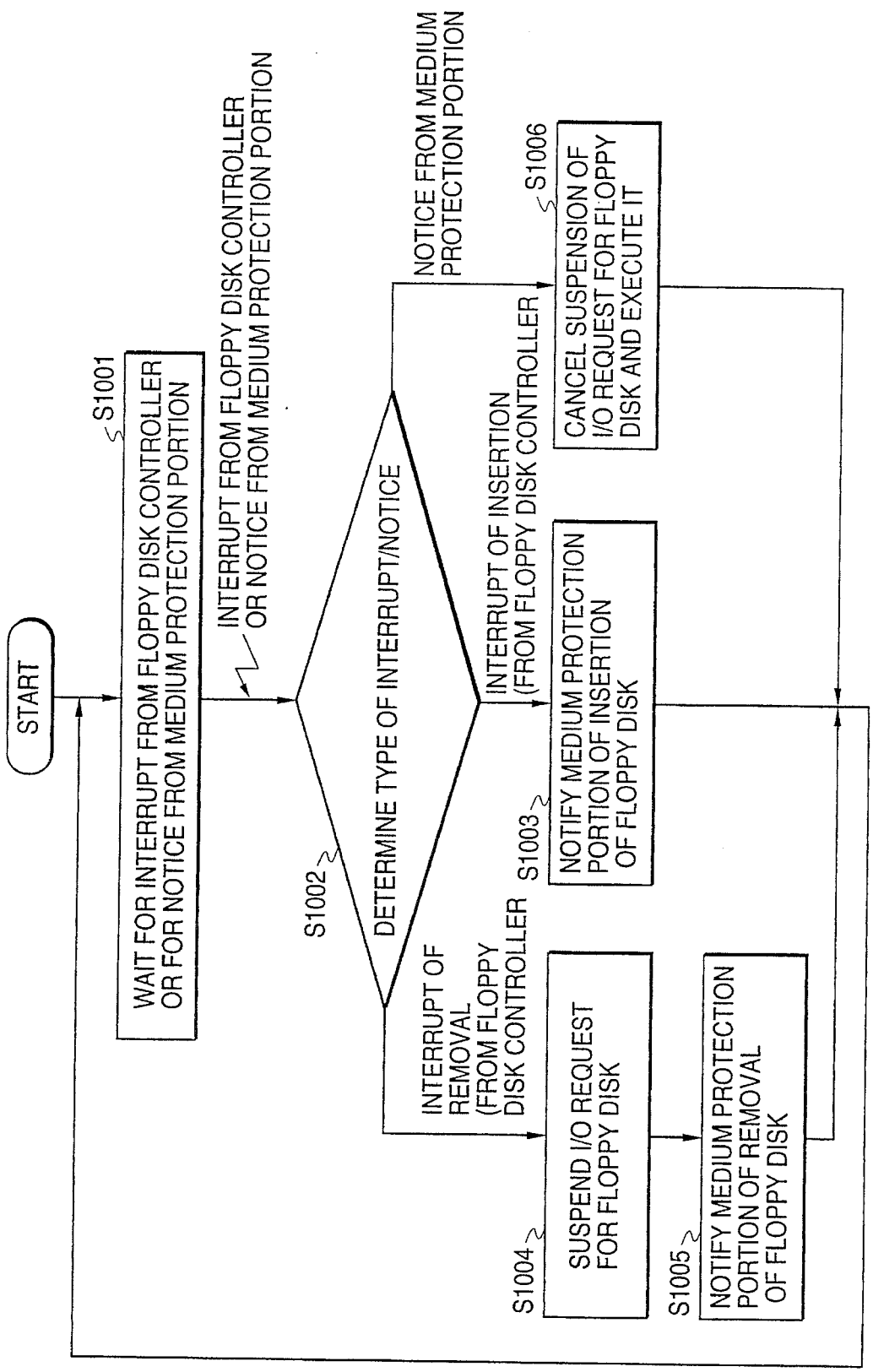
FIG. 10 is a flow chart for explaining the operation of a device driver for the FDD.

The device driver receives this notice at the step S1001 of the flow chart shown in FIG. 10. Then, the device driver starts executing suspended I/O processes for the floppy disk 103*f* (for example, the device driver outputs data which was read from the floppy disk 103*f* and which was buffered to the MPU 101).

Figure 12:
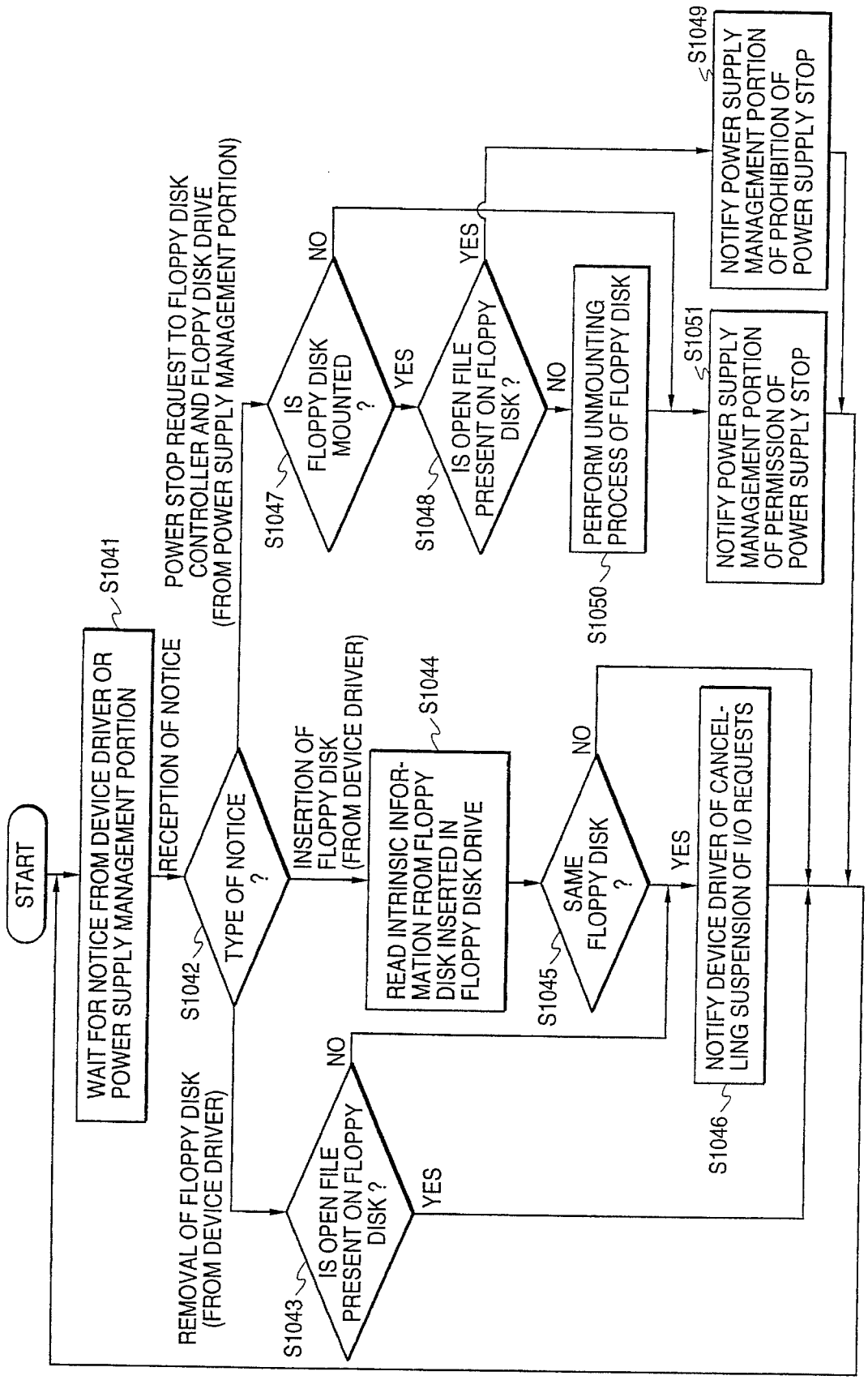
FIG. 12 is a flow chart for explaining the operation of a medium protection portion.

When there is an open file on the floppy disk 103*f* at the step S1043 of FIG. 12, the medium protection portion 202 returns the control directly to the step S1041 and waits for a notice.

When the medium protection portion 202 receives a notice representing that the floppy disk 103*f* is inserted in the FDD 103 from the device driver at the step S1042, it reads intrinsic information 1051' from the medium intrinsic information area 304 in the super block 300 of the floppy disk 103*f* inserted in the FDD 103 (at step S1044). In addition, the medium protection portion 202 reads intrinsic information 1051 from the system memory 105*s*. Thereafter, the medium protection portion 202 compares these intrinsic information 1051' and 1051 (at step S1045). When the medium protection portion 202 has determined that the floppy disk 103*f* removed from the FDD 103 is inserted thereto again (YES at the step S1045), it notifies the device driver that suspension of the I/O requests can be canceled (at step S1046) and returns the control to the step S1041 again.

The device driver receives this notice at the step S1001 of the flow chart shown in FIG. 10. Then, the device driver starts executing all I/O requests suspended at the step S1006.

Thus, even if the floppy disk 103*f* was mistakenly removed from the FDD 103 before all I/O processes for the floppy disk 103*f* had not been completed, when the floppy disk 103*f* is inserted in the floppy disk FDD 103 again, the suspended I/O processes for the floppy disk 103*f* are executed. Thus, all the suspended I/O requests for the floppy disk 103*f* can be executed without loss.

On the other hand, when the medium protection portion 202 has determined that the floppy disk 103*f* was removed from the FDD 103 and then a different floppy disk 103*f*' is inserted in the FDD 103 at the step S1045, it returns the control directly to the step S1041.

Thus, after a floppy disk 103*f* which has an opened file (namely, in an I/O accessible state) is removed from the FDD 103, another floppy disk 103*f*' is inserted in the FDD 103, suspended I/O processes for the floppy disk 103*f* are not performed for the floppy disk 103*f*'. Therefore, data of the floppy disk 103*f*' is not destroyed.

On the other hand, when the medium protection portion 202 receives a notice representing a power supply stop request for the FDC 104 and the FDD 103 from the power supply management portion 203 at the step S1042, it inquires of the file management portion 201 whether or not the floppy disk 103*f* is inserted in the FDD 103 and mounted in an operable state as a file system in the unit (at step S1047).

When the floppy disk 103*f* is mounted (YES at the step S1047), the medium protection portion 202 determines whether or not there is an open file on the floppy disk 103*f* (at step S1048). When there is an open file on the floppy disk 103*f* (YES at step S1048), the medium protection portion 202 notifies the power supply management portion 203 of the prohibition of the power supply stop request for the FDC 104 and the FDD 103 (at step S1049).

Figure 11:
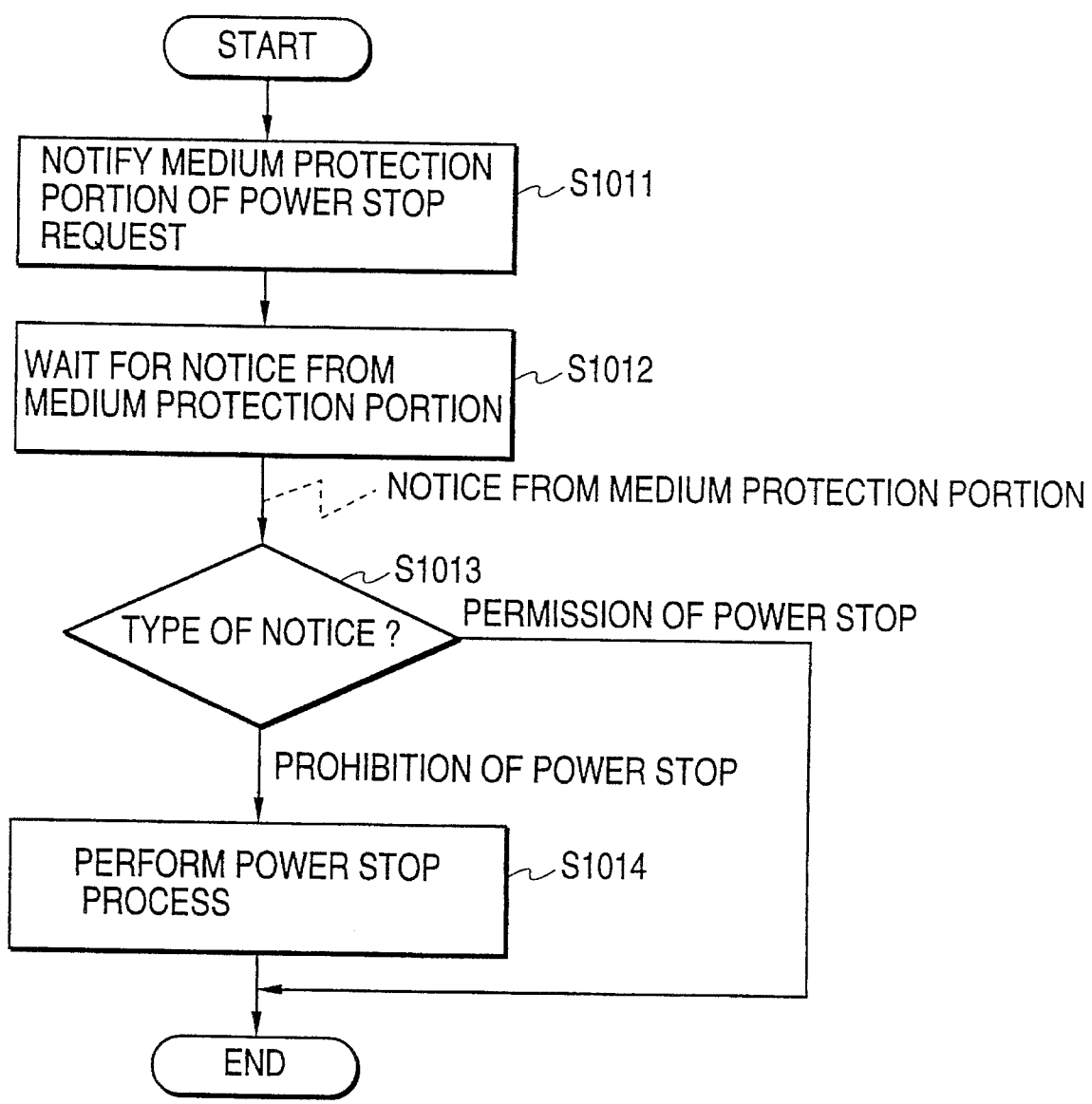
FIG. 11 is a flow chart for explaining the operation of a power supply management portion.

The power supply management portion 203 receives this notice when it is in the state of the step S1012 of the flow chart shown in FIG. 11. When the power supply management portion 203 receives this notice, it does not stop the supply of electric power to the FDC 104 and the FDD 103. Thus, even if a power supply stop request for the FDC 104 and the FDD 103 takes place, when there is an open file on the floppy disk 103*f* (namely, which is in an I/O accessible state), the supply of electric power to the FDC 104 and the FDD 103 is not stopped.

When the medium protection portion 202 has determined that all files on the floppy disk 103*f* are closed at the step S1048 (NO at the step S1048), it performs an unmounting process for the floppy disk 103*f* and cancels the registration of the floppy disk 103*f* from the unit (at step S1050). Thereafter, the medium protection portion 202 notifies the power supply management portion 203 of the permission of the power supply stop request (at step S1051).

The power supply management portion 203 receives this notice at the step S1013 of the flow chart shown in FIG. 11. When the power supply management portion 203 receives this notice, it causes the power supply portion 107 to stop the supply of electric power to the FDC 104 and the FDD 103.

The process sequence of the steps S1042>S1047>S1048>S1050>S1051 accords with the process of the steps S301>S302>S303>S304>S305>S306 of the flow chart shown in FIG. 9.

Thus, when there is an open file on the floppy disk 103*f* inserted in the FDD 103 (namely, the floppy disk 103*f* is in an I/O accessible state), if a power supply stop request for the FDC 104 and the FDD 103 takes place, the power supply management portion 203 does not permit this request. After the open file is closed, the medium protection portion 202 performs an unmounting process for the floppy disk 103*f* and then causes the supply of electric power to the FDC 104 and the FDD 103 to be stopped.

Thus, when a file on the floppy disk 103f inserted in the FDD 103 is opened, the power supply stop request for the FDC 104 and the FDD 103 is executed. Therefore, while the supply of electric power to the FDD 103 is stopped, an incorrect operation for replacing a floppy disk 103f inserted in the FDD 103 with another floppy disk 103f' cannot be performed. As a result, in an information processing unit with a resume function, while the supply of electric power to the FDC 104 and the FDD 103 is stopped, even if the floppy disk 103f is incorrectly replaced with the floppy disk 103f', data of the floppy disk 103f is not destroyed.

When the floppy disk 103f is not mounted in the step S1047 (namely, the floppy disk 103f is not in an operable state as a file system in the unit), since the unmounting process is not required, the medium protection portion 202 immediately notifies the power supply management portion 203 of the permission of the power supply stop request (at step S1051).

In the above-described embodiment, the floppy disk 103f as an exchangeable storage medium was described. However, it should be noted that the present invention is not limited to the floppy disk. Rather, the present invention may be applied to data protection for optomagnetic disks, IC memory cards, and other exchangeable storage mediums.

In addition, the intrinsic information 1051 is not limited to the above described current time. Instead, any information which is intrinsic to individual exchangeable storage mediums may be used.

As described above, according to the present invention, when a process for causing an exchangeable storage medium to become in an operable state as a file system in the information unit is performed. Processing an intrinsic information for identifying whether or not an exchangeable storage medium which was removed and inserted again is written to both the medium and memory of the unit. Therefore, even if another exchangeable storage medium which was initialized by another unit having no data protection function is used in the former unit, as long as the data format of the latter unit is the same as that of the former unit, data of the another storage medium can be protected.

In addition, even if an exchangeable storage medium is removed from the drive device in an I/O accessible state, an I/O request being executed and I/O requests being queued are suppressed, when the exchangeable storage medium being removed is inserted in the drive device, the process can be resumed without loss. Moreover, all I/O requests being issued until the medium is inserted can be processed.

In an information processing unit having a power supply stop function for a drive device, while an exchangeable storage medium is in an I/O accessible state, even if a power supply stop request for the drive device takes place, the stop request is not permitted. Only when the exchangeable storage medium is operable in the information processing unit, the power supply stop request for the drive device is permitted. Thus, as opposed to the related art, when an exchangeable storage medium is incorrectly replaced with a different medium while the power supply is stopped, data of the different medium can be protected from being destroyed.

Although the present invention has been shown and described with respect to a best mode embodiment thereof, it should be understood by those skilled in the art that the foregoing and various other changes, omissions, and additions in the form and detail thereof may be made therein without departing form the spirit and scope of the present invention.

What is claimed is:

1. A data protecting system for exchangeable storage media for use in an information processing device having a drive device in which said exchangeable medium is inserted, comprising:

detecting means for detecting insertion and removal of said exchangeable storage medium in and from said drive device;

medium identification writing means for writing medium identifying information to both a predetermined area of said exchangeable storage medium and a memory of said information processing device when a request to set said exchangeable storage medium in an operable state is issued;

medium identifying means for determining, if said detecting means has detected that said exchangeable storage medium was removed from said drive device and then an exchangeable storage medium was inserted again in said drive device, whether or not said removed exchangeable storage medium was inserted again in said drive device by checking if the medium identifying information written into the memory coincides with the value written into the predetermined area of said inserted exchangeable storage medium; and permitting means for permitting said inserted exchangeable storage medium to be I/O accessed only when said medium identifying means has determined that said removed exchangeable storage medium was inserted again in said drive device.

2. The data protecting system according to claim 1, further comprising:

suspending means for suspending the present I/O request being processed and the succeeding I/O requests for said exchangeable storage medium if said detecting means has detected that an exchangeable storage medium was removed from said drive device when it was in an I/O accessible state; and resuming means for resuming an execution of the I/O request suspended by said suspending means when said medium identifying means has determined that said exchangeable storage medium removed from said drive device was inserted again in said drive device.

3. The data protecting system according to claim 2, further comprising:

first forcibly terminating means for forcibly terminating the I/O requests suspended by said suspending means if an error has arisen when said medium identifying means reads data from the predetermined area of said exchangeable storage medium inserted in said drive device.

4. The data protecting system according to claim 2, further comprising:

inquiry means for inquiring of a user whether to terminate a determination process of said medium identifying means when the determined result of said medium identifying means is that the exchangeable storage medium newly inserted is not the same as the exchangeable storage medium removed; and second forced termination means for forcedly terminating I/O requests suspended by said suspension means when a reply of said user is to terminate the process of said medium identifying means.

5. The data protecting system according to claim 1, wherein said medium identification writing means writes current time as said medium identifying information to both said predetermined area of exchangeable storage medium and said memory of said information processing processing unit.

6. The data protecting system according to claim 1, wherein said exchangeable storage medium is a floppy disk;

wherein said drive device is a floppy disk drive; and wherein said medium identification writing means writes said medium identifying information to a predetermined block of said floppy disk.

7. A data protecting system for exchangeable storage medium for use in an information processing unit having a drive device in which said exchangeable storage medium is inserted, said system comprising:

first determination means for determining whether or not said exchangeable storage medium inserted in said drive device is in an operable state in said information processing unit when a power supply stop request for said drive device takes place;

second determination means for determining whether or not said exchangeable storage medium is in an accessible state when the result of said first determination means is the operable state; and power supply control means for determining whether or not to stop a supply of electric power to said drive device according to the results of said first determination means and said second determination means, so as to control the supply of electric power to said drive device.

8. The data protecting system according to claim 7, wherein said power supply control means causes said exchangeable storage medium to be in an inoperable state in said information processing unit and then stops the supply of electric power to said drive device when the result of said second determination means is not the I/O accessible state.

9. The data protecting system according to claim 7, wherein said power supply control means causes the supply of electric power to said drive device not to be stopped when the result of said second determination means is the I/O accessible state.

10. The data protecting system according to claim 7, wherein said power supply control means causes the supply of electric power to said drive device to be stopped when the result of said first determination means is not the operable state.

11. A data protecting system for exchangeable storage medium for use in an information processing unit having a drive device in which an exchangeable storage medium is inserted, said system comprising:

detection means for detecting an insertion and a removal of said exchangeable storage medium in and from said drive device;

first determination means for determining whether or not said exchangeable storage medium inserted in said drive device is in an operable state as a file system in said information processing unit;

second determination means for determining whether or not said exchangeable storage medium is in an accessible state when the result of said first determination means is the operable state;

medium identification writing means for writing medium identifying information to both a predetermined area of said exchangeable storage medium and a memory of said information processing unit when a request for causing said exchangeable storage medium to be in the operable state is issued;

medium identifying means for determining, if said detecting means and said second determining means have detected that said exchangeable storage medium was removed from said drive device when it was in an I/0 accessible state and then said detecting means has detected that an exchangeable storage medium was inserted again in said drive device, whether or not said removed exchangeable storage medium was inserted again in said drive device by checking if the medium identifying information written by said medium identification writing means to the memory in said information processing device has been written to the predetermined area of said inserted exchangeable storage medium; and permitting means for permitting said inserted exchangeable storage medium to be I/0 accessed only when said medium identifying means has determined that said removed exchangeable storage medium was inserted again in said drive device.

12. The data protecting system according to claim 11, further comprises:

suspending means for suspending the present I/O request being processed and the succeeding I/O requests for said exchangeable storage medium if said detecting means and said second detecting means have detected that an exchangeable storage medium was removed from said drive device when it was in an I/O accessible state; and resuming means for resuming an execution of the I/O request suspended by said suspending means when said medium identifying means has determined that said exchangeable storage medium removed from said drive device was inserted again in said drive device.

13. The data protecting system according to claim 11, further comprising:

first forcibly terminating means for forcibly terminating the I/O requests suspended by said suspending means if an error has arisen when said medium identifying means reads data from the predetermined area of said exchangeable storage medium inserted in said drive device.

14. The data processing system according to claim 12, further comprising:

inquiry means for inquiring of an operator whether to terminate a determination process of said medium identifying means when the determined result of said medium identifying means is that the exchangeable storage medium newly inserted is not the same as the exchangeable storage medium removed; and second forced terminating means for forcedly terminating said determination process of said medium identifying means and I/O requests suspended by said suspension means when a reply of said operator according to said inquiry means is a permission to terminate the determination process of said medium identifying means.

15. The data protecting system according to claim 11, further comprising:

power supply control means for determining whether or not to stop a supply of electric power to said drive device according to the results of said first determination means and said second determination means, so as to control the supply of electric power to said drive device.

16. The data protecting system according to claim 15, wherein said power supply control means causes said exchangeable storage medium to be in an inoperable state in said information processing unit and then stops the supply of electric power to said drive device when the result of said second determination means is not the I/O accessible state.

17. The data protecting system according to claim 15, wherein said power supply control means causes the supply of electric power to said drive device not to be stopped when the result of said second determination means is the I/O accessible state.

18. The data protecting system according to claim 15, wherein said power supply control means causes the supply of electric power to said drive device to be stopped when the result of said first determination means is not the operable state.

* * * * *